(12) United States Patent
Thomas et al.

(10) Patent No.: US 8,663,066 B2
(45) Date of Patent: Mar. 4, 2014

(54) POWERTRAIN DRIVELINE WARM-UP SYSTEM AND METHOD

(71) Applicants: Steven Thomas, Bloomfield Hills, MI (US); John Edward Brevick, Livonia, MI (US)

(72) Inventors: Steven Thomas, Bloomfield Hills, MI (US); John Edward Brevick, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/775,161

(22) Filed: Feb. 23, 2013

(65) Prior Publication Data

US 2013/0213335 A1    Aug. 22, 2013

Related U.S. Application Data

(62) Division of application No. 12/753,318, filed on Apr. 2, 2010, now Pat. No. 8,410,401.

(51) Int. Cl.
*B60W 10/04* (2006.01)
*B60W 10/00* (2006.01)
*F02N 15/02* (2006.01)

(52) U.S. Cl.
USPC ............. 477/37; 477/39; 477/86; 477/90; 74/7 C (58) Field of Classification Search
USPC ....... 123/142.5 R; 474/37, 39, 86, 90; 74/7 C
See application file for complete search history.

(56) References Cited

U.S. PATENT DOCUMENTS

| | | | | |
|---|---|---|---|---|
| 4,576,263 A | * | 3/1986 | Lane et al. | 477/72 |
| 6,227,998 B1 | * | 5/2001 | Iwao et al. | 477/79 |
| 7,217,221 B2 | * | 5/2007 | Sah et al. | 477/3 |
| 2003/0196503 A1 | * | 10/2003 | Kobayashi | 74/333 |
| 2004/0079608 A1 | * | 4/2004 | Kupper et al. | 192/103 R |
| 2008/0312034 A1 | * | 12/2008 | Shultz et al. | 477/98 |
| 2009/0036265 A1 | * | 2/2009 | Hwang et al. | 477/76 |
| 2009/0090592 A1 | * | 4/2009 | Mordukhovich et al. | 192/58.2 |
| 2009/0093339 A1 | * | 4/2009 | Chen | 477/61 |
| 2011/0046861 A1 | * | 2/2011 | Moriyama et al. | 701/67 |

* cited by examiner

*Primary Examiner* — Lindsay Low
*Assistant Examiner* — Tea Holbrook
(74) *Attorney, Agent, or Firm* — James Dottavio, Esq.; Tung & Associates (57) ABSTRACT

A powertrain/driveline warm-up system includes a vehicle controller, an electrical power source interfacing with the vehicle controller, at least one heater interfacing with the vehicle controller and at least a portion of a vehicle powertrain provided in thermal contact with the at least one heater.

21 Claims, 7 Drawing Sheets

POWERTRAIN DRIVELINE WARM-UP SYSTEM AND METHOD

This is a Divisional Application of U.S. patent application Ser. No. 12/753,318 filed on Apr. 2, 2010.

FIELD

The disclosure generally relates to vehicle powertrains. More particularly, the disclosure relates to a powertrain/driveline warm-up system and method in which powertrain/driveline oil is heated before and/or during vehicle startup to reduce viscosity of the oil and enhance fuel economy of the vehicle.

BACKGROUND

The powertrains (engine and transmission, front and rear differentials, transfer case, power take-off unit and wheel bearings) of automotive vehicles are typically lubricated by powertrain oils which reduce wear and operating temperatures of powertrain components during vehicle operation. At the beginning of vehicle operation, the powertrain oils are cold and viscous. Therefore, the unheated oils exert resistance against movement of the powertrain components which may reduce the fuel economy of the vehicle through parasitic power losses.

Accordingly, a powertrain warm-up system and method in which powertrain oil is heated before and/or during vehicle start-up to reduce viscosity of the oil and enhance fuel economy of the vehicle is needed.

SUMMARY

The disclosure is generally directed to a powertrain warm-up system. An illustrative embodiment of the powertrain warm-up system includes a vehicle controller, an electrical power source interfacing with the vehicle controller, at least one heater interfacing with the vehicle controller and at least a portion of a vehicle powertrain provided in thermal contact with the at least one heater.

In some embodiments, the powertrain warm-up system may include a vehicle controller; a vehicle powertrain interfacing with the vehicle controller; and a wet clutch having automatic transmission fluid engaging the vehicle powertrain. A wet clutch may be adapted to provide partial transmission tie-up of the vehicle transmission and heat the automatic transmission fluid during vehicle deceleration.

The disclosure is further generally directed to a method of warming a powertrain of a vehicle. An illustrative embodiment of the method includes providing at least a portion of a vehicle powertrain, providing a source of heat and warming at least a portion of a vehicle powertrain by applying heat from the energy source to at least a portion of a vehicle powertrain.

BRIEF DESCRIPTION OF THE DRAWINGS

The disclosure will now be made, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
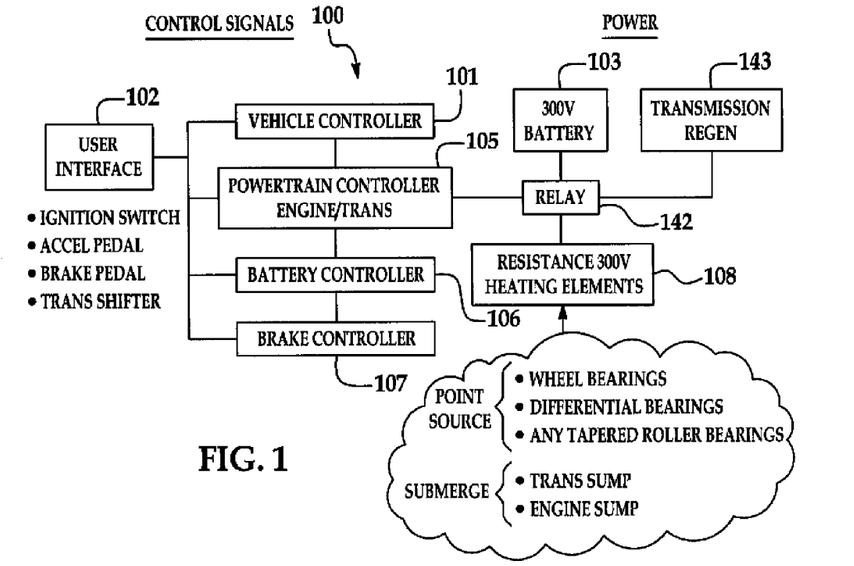
FIG. 1 is a block diagram of an illustrative embodiment of the powertrain warm-up system, implemented in conjunction with a hybrid vehicle.

Referring initially to FIGS. 1, 1A, 1B and 1C, an illustrative embodiment of the powertrain warm-up system, hereinafter system, is generally indicated by reference numeral 100 in FIG. 1. In some applications, the system 100 may be suitable for implementation on a hybrid powertrain vehicle (not shown). In other applications, the system 100 may be applicable to other types of vehicles. The vehicle may include an onboard vehicle controller 101 having a user interface 102. The user interface 102 may include an ignition switch, an accelerator pedal, a brake pedal and/or a transmission shifter, for example and without limitation. A powertrain controller 105 which controls the engine and transmission of the vehicle, a battery controller 106 and a brake controller 107 may additionally interface with the vehicle controller 101 and the user interface 102. A relay 142 may be connected to the powertrain controller 105. At least one high-voltage vehicle battery 103, a transmission kinetic energy recovery generator 143 and resistance heating elements 108 may be electrically connected to the relay 142. In some embodiments, the resistance heating elements 108 may be 300-volt resistance heating elements. The resistance heating elements 108 may be disposed in thermal contact with at least a portion of the powertrain or engine/transmission (not shown) of the vehicle for the purpose of heating engine/transmission oil (not shown) in the engine/transmission, as will be hereinafter described, and reducing the viscosity of the engine/transmission oil to enhance the fuel economy of the vehicle.

The vehicle controller 101 may be programmed to operate the resistance heating elements 108 by drawing electrical current from the battery 103 responsive to operation of the ignition switch of the user interface 102. In some embodiments, the vehicle controller 101 may be adapted to monitor the temperature of the engine/transmission oil and terminate further operation of the resistance heating elements 108 when the engine/transmission oil reaches a predetermined target temperature. In some embodiments, the predetermined target temperature of the engine/transmission oil 110 may be the point of diminishing returns based on the viscosity curve of the oil which in some applications may be about 80% of the operating temperature for the engine/transmission oil.

Figure 1A:
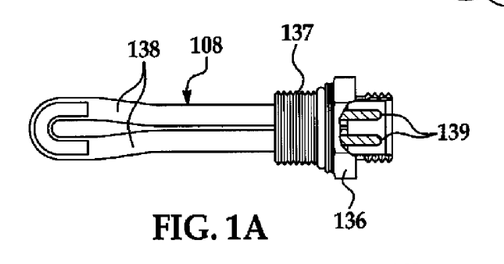
FIG. 1A is a side view of an exemplary submersible resistive heater which is suitable for implementation of an illustrative embodiment of the powertrain warm-up system.
Figure 1B:
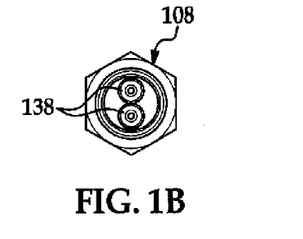
FIG. 1B is an end view of the submersible resistive heater shown in FIG. 1A.

An exemplary submersible resistive heating element 108 which is suitable for implementation of the system 100 is shown in FIGS. 1A and 1B. The submerged resistive heating element 108 may operate on 14V DC, 1 kW and include a base 136 having a threaded base attachment nipple 137. A looped heating element 138 may extend from the base 136. Terminals 139 may be provided on respective ends of the heating element 138 for electrical connection to the electrical system battery 103 (FIG. 1). The heating element 138 may be disposed in thermal contact with at least a portion of the vehicle powertrain which may include the engine/transmission and/or the engine/transmission oil, for example and without limitation.

Figure 1C:
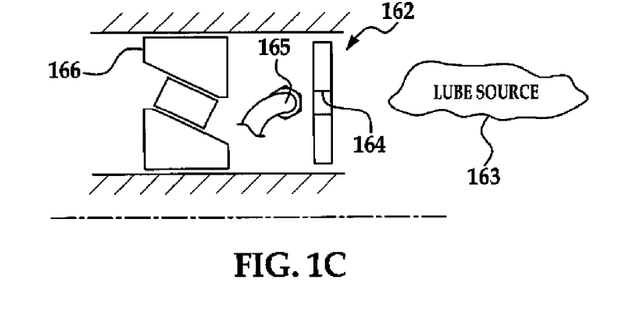
FIG. 1C is a schematic diagram of an exemplary point source resistive heating element which is suitable for implementation of an illustrative embodiment of the powertrain warm-up system.
Figure 1D:
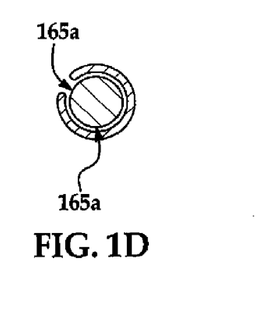
FIG. 1D is an enlarged cross-sectional view of the resistive heating element.

An exemplary point source resistive heating element which is suitable for implementation of an illustrative embodiment of the powertrain warm-up system is generally indicated by reference numeral 165 in FIG. 1C and FIG. 1D. The point source resistive heating element 165 may include a high temperature structure 165a and a wire wound 165b, and a lube source 163. An oil flow orifice 164 may be disposed in fluid communication with the lube source 163. A heating coil 165 may communicate with the oil flow orifice 164. A tapered roller bearing 166 may be provided generally adjacent to the heating coil 165, which is constructed of a high temperature core 165a and an RHE (wire wound) 165b.

In an exemplary application of the system 100, an operator (not shown) of the vehicle utilizes the user interface 102 to initiate operation of the vehicle. Responsive to operation of the user interface 102, the engine/transmission (not shown) of the vehicle operates typically in the conventional manner. As the user initiates operation of the user interface 102, the vehicle controller 101 via the battery controller 106 draws electrical current from the battery 103 to the resistive heating elements 108. Accordingly, the resistive heating elements 108 may heat the engine/transmission oil until the engine/transmission oil reaches the predetermined temperature after which the vehicle controller 101 terminates further operation of the resistive heating elements 108. In some applications, the vehicle controller 101 may operate the resistive heating elements 108 until the engine/transmission oil reaches about 80% of the normal operating temperature of the engine/transmission oil, as determined by the vehicle controller 101, and then terminate further operation of the resistive heating elements 108. Accordingly, during vehicle start-up and the initial stages of vehicle operation, the viscosity of the heated engine/transmission oil drops and the resistance of the engine/transmission oil to moving parts within the engine/transmission is reduced, thereby enhancing the fuel economy of the vehicle. During braking and deceleration of the vehicle, the transmission regen generator 143 may generate electrical power for heating of the resistive heating elements 108 either directly or indirectly through the battery 103.

Figure 5:
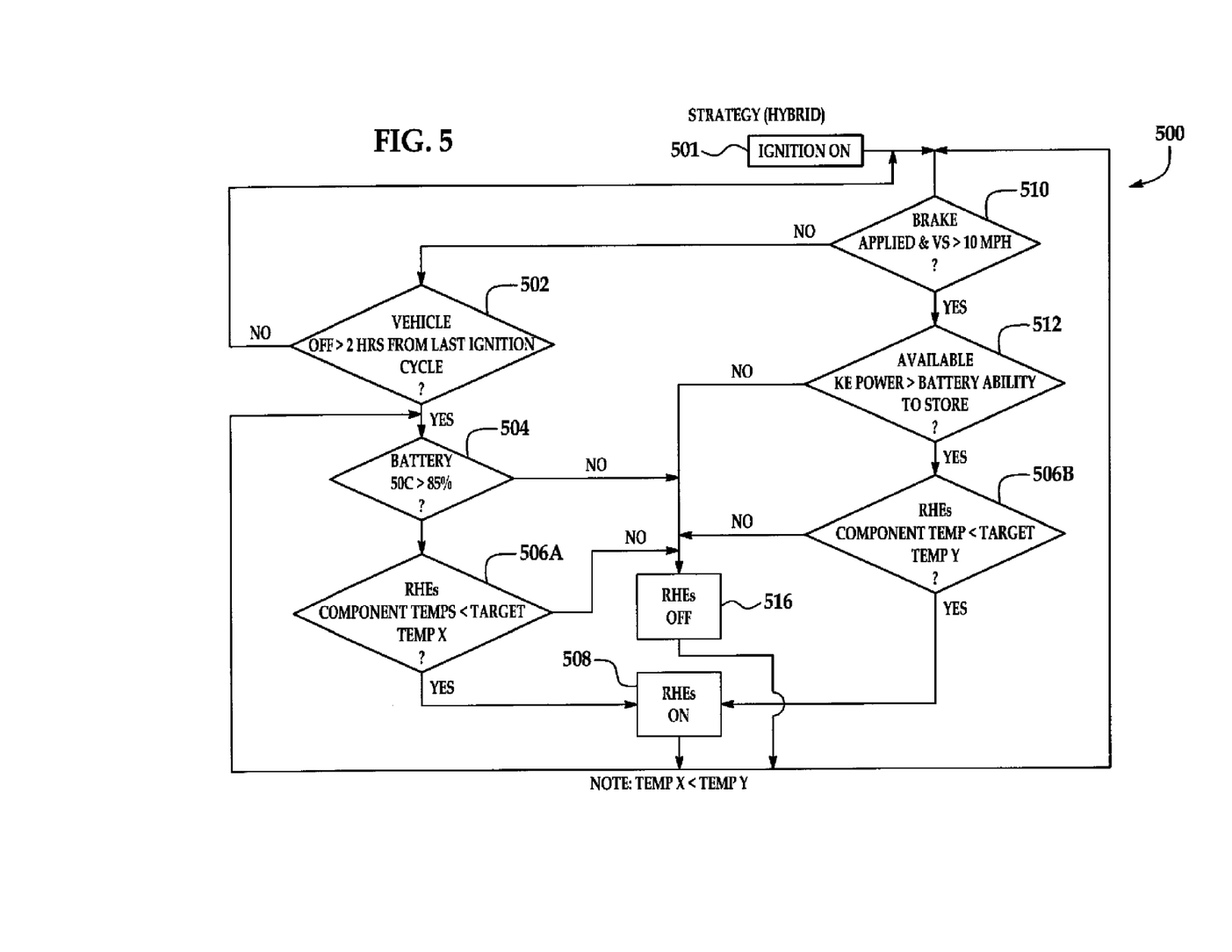
FIG. 5 is a flow diagram of an illustrative embodiment of the powertrain warm-up method, implemented in conjunction with a hybrid vehicle.

Referring next to FIG. 5, a flow diagram 500 of an illustrative operational strategy of the system 100 of FIG. 1 is shown. When the ignition is on (block 501) and if the vehicle remains off for more than 2 hours (block 502), the vehicle battery charge is greater than 85% of charge capacity (block 504) and the temperature of the resistive heating elements is less than a predetermined target temperature (block 506A), then the resistive heating elements are powered to heat the transmission oil using electrical power stored in the vehicle battery (block 508). On the other hand, if the temperature of the resistive heating elements is equal to or greater than the predetermined target temperature (block 506B), the resistive heating elements are not heated (block 516).

In the event that the vehicle brake is applied (block 510) during operation of the vehicle and the available kinetic energy is greater than the storage capacity of the vehicle battery (block 512) and the temperature of the resistive heating elements is less than a predetermined target temperature (block 506), then the resistive heating elements are heated (block 506). In the event that the temperature of the resistive heating elements is greater than or equal to the predetermined target temperature (block 506), then the resistive heating elements are not heated (block 516).

Figure 2:
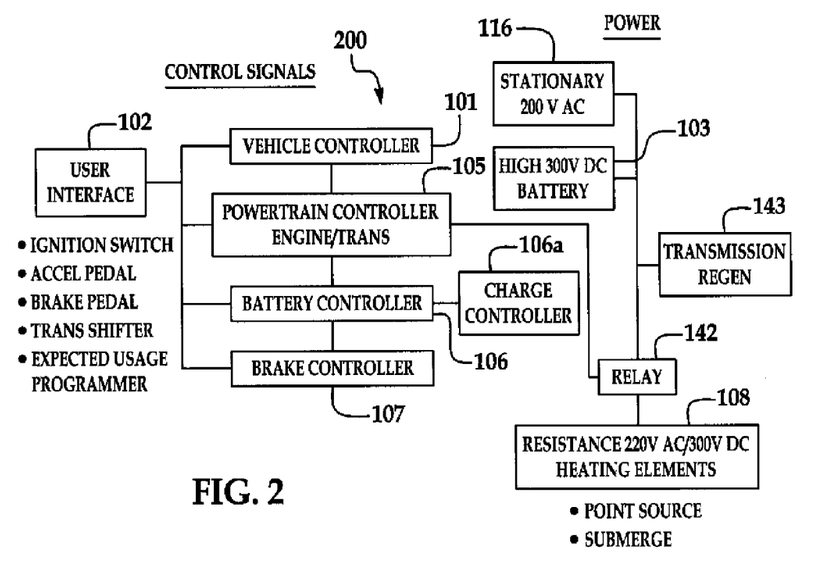
FIG. 2 is a block diagram of an illustrative embodiment of the powertrain warm-up system, implemented in conjunction with a plug-in hybrid vehicle.

Referring next to FIG. 2, an alternative illustrative embodiment of the powertrain warm-up system, hereinafter system, is generally indicated by reference numeral 200. In some applications, the system 200 may be suitable for implementation on a plug-in hybrid powertrain vehicle (not shown) having a basic design which may be similar to that of the hybrid powertrain vehicle which was heretofore described with respect to FIG. 1. A charge controller 106a may interface with the battery controller 106 of the plug-in hybrid powertrain vehicle. A plug-in port (not shown) of the vehicle may be adapted for connection to an external stationary power supply 116 such as a 220-volt power supply, for example and without limitation, which interfaces with the relay 142 for the purpose of recharging the vehicle battery 103 typically in the conventional manner.

The vehicle controller 101 may be programmed to operate the resistive heating elements 108 by drawing electrical current from the stationary power supply 116 when the stationary power supply 116 is plugged into the vehicle plug-in port for charging of the vehicle battery 103. In some embodiments, the vehicle controller 101 may be programmed to operate the resistive heating elements 108 on a selected or rotating schedule (such as one hour prior to operation of the vehicle, for example and without limitation). The vehicle controller 101 may also be programmed to operate the resistive heating elements 108 by drawing electrical current from the on-board vehicle battery 103 responsive to operation of the ignition switch (not shown) of the user interface 102 after disconnection of the vehicle plug-in port from the stationary power supply 116. In some embodiments, the vehicle controller 101 may be adapted to monitor the temperature of the engine/transmission oil of the vehicle and terminate further operation of the resistive heating elements 108 when the engine/transmission oil reaches a predetermined target temperature. In some embodiments, the predetermined target temperature of the engine/transmission oil may be about 80% of the operating temperature for the engine/transmission oil.

In an exemplary application of the system 200, the stationary power supply 116 is plugged into the plug-in port of the vehicle to recharge the vehicle battery 103 after operation of the vehicle. The user inputs 102 may be used to program the vehicle controller 101 to operate the resistive heating elements 108 and warm the engine/transmission oils of the vehicle at selected times by drawing electrical current from the stationary power supply 116. For example and without limitation, in some applications the vehicle controller 101 may be programmed to operate the resistive heater(s) 108 one hour prior to the next operation of the vehicle 118.

Prior to operation of the vehicle 118, the plug-in port of the vehicle is unplugged from the stationary power supply 116. At the time of operation of the vehicle, an operator (not shown) of the vehicle utilizes the user interface 102 to begin operation of the vehicle. Responsive to operation of the user interface 102, the engine/transmission (not shown) of the vehicle operates typically in the conventional manner. As the user initiates operation of the ignition switch of the user interface 102, the vehicle controller 101 draws electrical current from the vehicle battery 103 to the resistive heating elements 108. Accordingly, the resistive heating elements 108 may continue to heat the engine/transmission oil until the engine/transmission oil reaches the predetermined temperature, at which time the vehicle controller 101 terminates further operation of the resistive heating elements 108. In some applications, the vehicle controller 101 may operate the resistive heating elements 108 until the engine/transmission oil reaches about 80% of the normal operating temperature of the engine/transmission oil, as determined by the vehicle controller 101, and then terminate further operation of the resistive heating elements 108. Accordingly, during vehicle start-up and the initial stages of vehicle operation, the viscosity of the heated engine/transmission oil drops and the resistance of the engine/transmission oil to moving parts within the engine/transmission of the vehicle is reduced, thereby enhancing the fuel economy of the vehicle. During braking and deceleration of the vehicle, the transmission regen generator 143 may generate electrical power for heating of the resistive heating elements 108 either directly or indirectly through the battery 103. Note that RHE power from regen is lower cost than power from the battery, therefore component temperature targets are lower for the battery than for regen.

Figure 6:
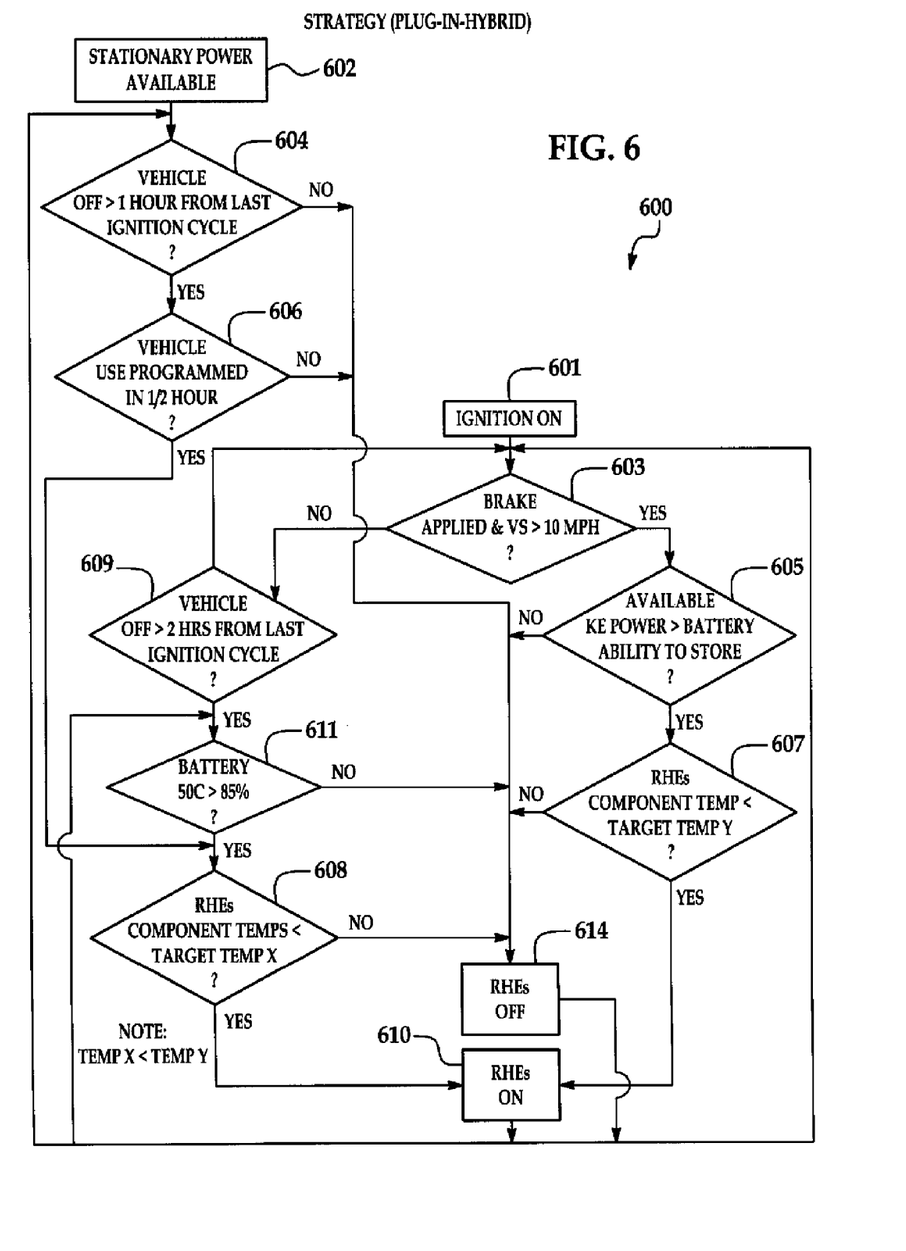
FIG. 6 is a flow diagram of an illustrative embodiment of the powertrain warm-up method, implemented in conjunction with a plug-in hybrid vehicle.

Referring next to FIG. 6, a flow diagram 600 of an illustrative operational strategy of the system 200 of FIG. 2 is shown. If stationary power is available (block 602), the vehicle has been turned off for greater than one hour (block 604), expected use of the vehicle has been programmed to one-half hour (block 606) and the resistive heating elements have a temperature which is less than a predetermined target temperature (block 608), then the resistive heating elements are heated (block 610). If the resistive heating elements have a temperature which is equal to or greater than the predetermined target temperature (block 608), then the resistive heating elements are not heated (block 614). Also shown in FIG. 6, when the ignition is on (block 601) and the brake is applied when vehicle speed is more than 10 mph (block 603), if the available KE power is larger than the battery ability to store (block 605), and the RHE's component temperature is smaller than target temperature Y (block 607), the RHE's is turned on (block 610). If the answer to block 603 is NO, then if vehicle is off for more than 2 hours from last ignition cycle (block 609), and battery SOC is larger than 85% (block 611), block 608 is carried out.

Figure 3:
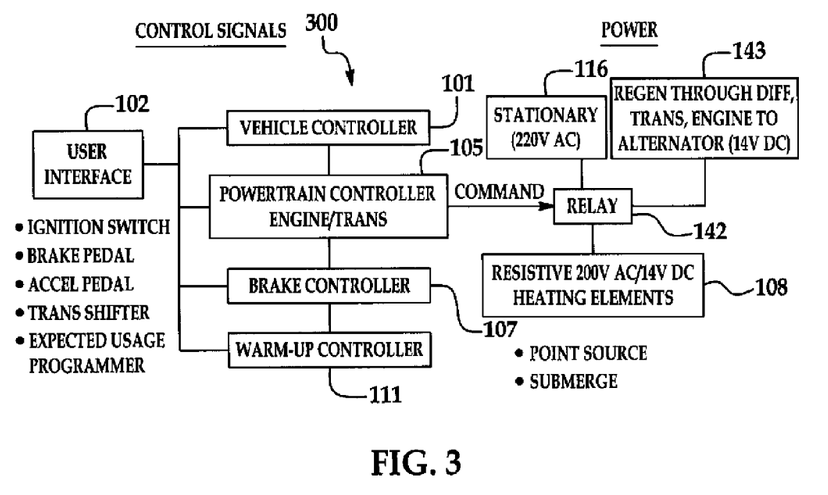
FIG. 3 is a block diagram of an illustrative embodiment of the powertrain warm-up system, implemented in conjunction with a non-hybrid vehicle, but with plug-in capability.

Referring next to FIG. 3 of the drawings, another alternative illustrative embodiment of the powertrain warm-up system is generally indicated by reference numeral 300. In some applications, the system 300 may be suitable for implementation on a non-hybrid vehicle (not shown). In the system 300, a brake controller 107 and a warm-up controller 111 may interface with the vehicle controller 101. The resistive heating elements 108 interface with the powertrain controller 105 through the relay 142 and may be electrically connected to the engine/transmission/alternator (not shown). At least a portion of the powertrain or engine/transmission/alternator, such as the oil sumps (not shown) of the vehicle, may be disposed in thermal contact with the resistive heating elements 108. A transmission regen generator 143 through the vehicle differential, transmission and engine to the vehicle alternator may interface with the powertrain controller 105 through the relay 142.

The vehicle controller 101 may be programmed to operate the resistive heating elements 108 and heat the oil sumps of the vehicle transmission by drawing electrical current from the stationary power supply 116 when the stationary power supply 116 is plugged into a plug-in port (not shown) of the vehicle for charging of the vehicle battery (not shown). In some embodiments, the vehicle controller 101 may be programmed to operate the resistive heating elements 108 on a selected or rotating schedule (such as one hour prior to operation of the vehicle, for example and without limitation). The engine/transmission/alternator (not shown) of the vehicle may be adapted to generate electrical power through the regen generator 143 during deceleration of the vehicle. The engine/transmission/alternator via the regen generator 143 may also be adapted to transmit the generated electrical power directly to the resistive heating elements 108 to heat the oil sumps during deceleration of the vehicle.

In an exemplary application of the system 300, the stationary power supply 116 is plugged into the plug-in port of the vehicle to recharge the vehicle battery (not shown) after operation of the vehicle. The user interface 102 may be used to program the powertrain controller 105 to operate the resistive heating elements 108 by drawing electrical current from the stationary power supply 116 and warm the engine/transmission oils at selected times. For example and without limitation, in some applications the powertrain controller 105 may be programmed to operate the resistive heating elements 108 one hour prior to the next operation of the vehicle.

Upon vehicle deceleration during operation of the vehicle, kinetic energy of the vehicle is transmitted through the engine/transmission/alternator via the regen generator 143, which generates electrical power. The generated electrical power is transmitted to the vehicle battery (not shown) and the powertrain controller 105 powers the resistive heating elements 108 to heat the oil sumps of the vehicle transmission by drawing electrical current from the regen generator 143 in the transmission. The vehicle controller 101 may terminate further operation of the resistive heating elements 108 when the temperature of the oil sumps reaches a predetermined target temperature. In some applications, the powertrain controller 105 may operate the resistive heating elements 108 until the oil sumps reach about 80% of the normal operating temperature of the oil sumps, as determined by the vehicle controller 101, and then terminate further operation of the resistive heating elements 108. Accordingly, upon vehicle start-up and during the initial stages of vehicle operation, the viscosity of the heated engine/transmission oil (not shown) in the oil sumps drops and the resistance of the engine/transmission oil to moving parts within the engine/transmission is reduced, thereby enhancing the fuel economy of the vehicle.

Figure 7:
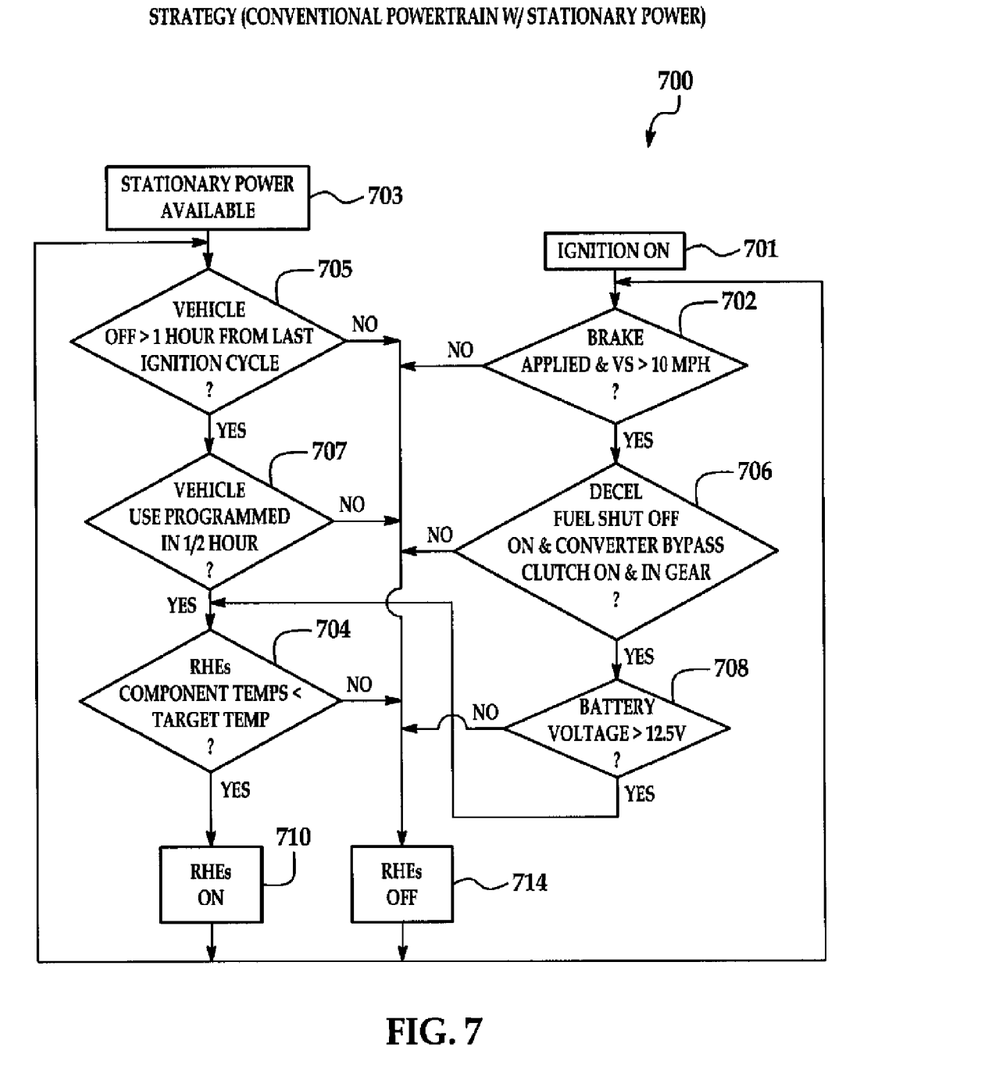
FIG. 7 is a flow diagram of an illustrative embodiment of the powertrain warm-up method, implemented in conjunction with a non-hybrid, plug-in vehicle.

Referring next to FIG. 7, a flow diagram 700 of an illustrative operational strategy of the system 300 of FIG. 3 is shown. If the ignition is on (block 701) and the brake pedal of the vehicle is applied during operation of the vehicle (block 702), the temperature of the resistive heating elements is less than a predetermined target temperature (block 704), the deceleration fuel shutoff, converter bypass clutch is on and is in gear (block 706), if the voltage of the vehicle battery is greater than 12.5 volts (block 708), then the resistive heating elements are heated in block 710. If the temperature of the resistive heating elements is equal to or greater than the predetermined target temperature (block 704), then the resistive heating elements are not heated (block 714). Also shown in FIG. 7, when stationary power is available (block 703), a vehicle is off more than 1 hour from last ignition cycle (block 705), and vehicle used programmed in ½ hour (block 707), then blocks 704 and 710, or 714 take place.

Figure 4:
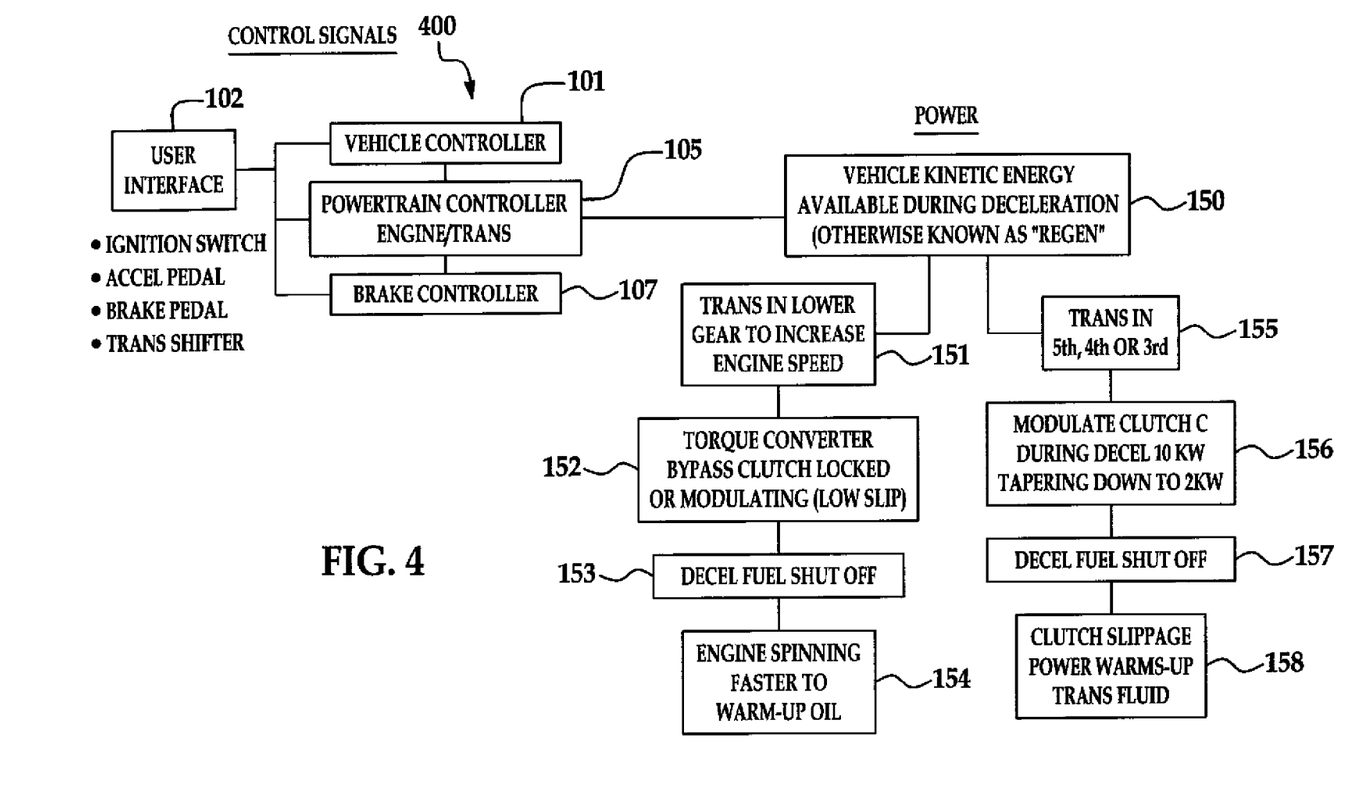
FIG. 4 is a block diagram of an illustrative embodiment of the powertrain warm-up system, implemented in conjunction with a non-hybrid vehicle having a wet clutch.

Referring next to FIG. 4 of the drawings, another alternative illustrative embodiment of the powertrain warm-up system is generally indicated by reference numeral 400. The system 400 may be applicable to a vehicle (not shown) having an engine/transmission with a wet dual clutch/multi-clutch planetary transmission each of which may interface with the vehicle controller 101 that interfaces with the user interface 102. A powertrain controller 105 for the engine/transmission may interface with the user interface 102. The engine/transmission of the vehicle may be immersed or otherwise contacted by automatic transmission fluid (not shown). A brake controller 107 may interface with the user interface 102. In some embodiments, the brake controller 107 may control a series braking system (not shown) such as that used in hybrid powertrain applications for seamless braking feel.

During deceleration of the vehicle, the powertrain controller 105 may be adapted to modulate a wet clutch to provide a partial tie-up of the transmission which decelerates the vehicle and causes heating of the automatic transmission fluid at a controlled rate by friction. Accordingly, vehicle kinetic energy which is available during deceleration 150 may be channeled from the transmission. In block 151, the transmission may be shifted to a lower gear to increase the engine speed. Consequently, in block 152, a torque converter bypass clutch may be locked or modulating (low slip). In block 153, deceleration fuel shutoff may be carried out. In block 154, this may cause the engine to rotate faster to increase heating of the transmission oil.

In block 155, the transmission may be shifted to the $5^{th}$, $4^{th}$ or $3^{rd}$ gear. In block 156, clutch C may be modulated during deceleration such that 10 kw tapers down to 2 kw. In block 157, deceleration fuel shutoff may be implemented. In block 158, clutch slippage power heats the transmission fluid.

In some embodiments, the vehicle controller 101 may be adapted to monitor the temperature of the automatic transmission fluid and provide an indication (not shown) to the operator of the vehicle when the automatic transmission fluid reaches a predetermined target temperature (such as about 80% of the operating temperature for the automatic transmission fluid, for example and without limitation). Accordingly, when the temperature of the automatic transmission fluid has reached the predetermined target temperature, the vehicle operator may elect to utilize the vehicle braking system with brake controller 107 to decelerate the vehicle. In some embodiments, the vehicle controller 101 may be adapted to terminate partial transmission tie-up of the engine/transmission when the automatic transmission fluid reaches a predetermined target temperature such as about 80% of operating temperature, for example and without limitation.

In exemplary application of the system 400, the vehicle is operated in the conventional manner by engagement of the engine/transmission. During deceleration of the vehicle, the vehicle transmission may be shifted to, for example, $5^{th}$, $4^{th}$ or $3^{rd}$ gears (block 155) and the vehicle controller 101 may engage a wet clutch to provide a partial tie-up of the vehicle transmission. Therefore, the partial tie-up of the transmission heats the automatic transmission fluid, the viscosity of which drops. Consequently, the resistance of the automatic transmission fluid to moving parts within the engine/transmission is reduced, thereby enhancing the fuel economy of the vehicle.

Figure 8:
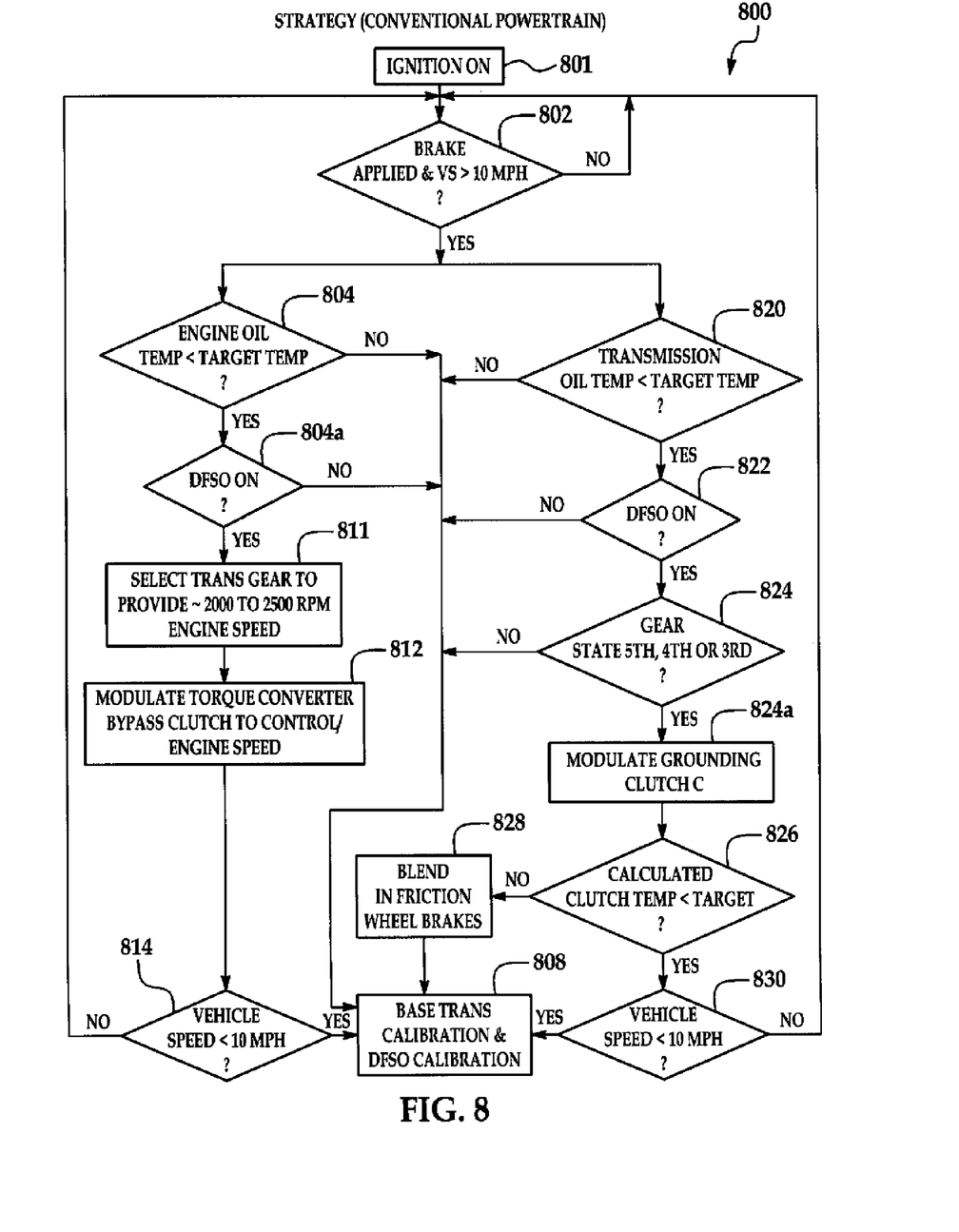
FIG. 8 is a flow diagram of an illustrative embodiment of the powertrain warm-up method, implemented in conjunction with a vehicle having a wet clutch.

Referring next to FIG. 8, a flow diagram 800 of an illustrative operational strategy of the system 400 of FIG. 4 is shown. If the ignition is on (block 801), the brake pedal (block 802) of the vehicle is applied at a vehicle speed of greater than a predetermined speed (such as 10 mph). If the engine oil temperature is less than or equal to a predetermined target temperature (block 804), and the deceleration fuel shutoff (DFSO) strategy is implemented (block 804a), then if the engine oil temperature is greater than the predetermined target temperature (block 804), the base trans and DFSO strategy and calibration is implemented (block 808). In block 810, the appropriate gear is selected based on the vehicle speed in order to achieve a targeted engine speed (such as 2000 rpm, for example). In block 812, the converter clutch of the vehicle may be modulated to achieve the desired engine speed and provide smooth transitions. If the vehicle speed is less than 10 mph (block 814), the base trans and DFSO strategy and calibration are resumed (block 818) and the speed of the engine is reduced.

If the automatic transmission fluid (ATF) is less than a predetermined target temperature (block 820), and DFSO strategy is implemented (block 822), then the strategy proceeds through blocks 824, 826 and 828 warming the transmission fluid. If the automatic transmission fluid is equal to or greater than the predetermined target temperature (block 820), the base trans and DFSO strategy and calibration are implemented without implementing blocks 824, 826 and 828.

In block 824a, the clutch C is modulated proportional to the brake pedal pressure in, for example, $5^{th}$, $4^{th}$ or $3^{rd}$ gear. In block 826, the clutch temperature over the temperature limit is calculated. In block 828, friction brakes may be blended more at the vehicle wheels. If the vehicle speed is less than a predetermined speed (such as 10 mph) in block 830, the base trans and DSFO strategy and calibration are resumed in block 808.

Although the embodiments of this disclosure have been described with respect to certain exemplary embodiments, it is to be understood that the specific embodiments are for purposes of illustration and not limitation, as other variations will occur to those of skill in the art.

The invention claimed is:

1. A powertrain warm-up system, comprising:
   at least one controller, said controller configured to execute programmed instructions stored in a controller readable memory;
   a vehicle powertrain interfacing with said at least one controller, said vehicle power train comprising a transmission;
   a wet clutch at least partially immersed in automatic transmission fluid and engaging said vehicle powertrain, said wet clutch interfacing with said at least one controller;
   a torque converter bypass clutch at least partially immersed in said automatic transmission fluid and engaging said vehicle powertrain, said torque converter bypass clutch interfacing with said at least one controller; and
   said at least one controller configured to control at least one of said wet clutch and said torque converter bypass clutch to induce partial transmission tie-up of said vehicle powertrain during vehicle deceleration to thereby heat said automatic transmission fluid.

2. The system of claim 1 further comprising a user interface and wherein said at least one controller comprises a vehicle controller, a powertrain controller and a brake controller interfacing with said user interface.

3. The system of claim 1 wherein said at least one controller is configured to control during vehicle deceleration at least one of sup lying fuel to said engine comprising said vehicle, modulation of said torque converter bypass clutch, and shifting said transmission to a lower gear to increase said engine speed to thereby warm up at least one of engine oil and said automatic transmission fluid upon said vehicle deceleration.

4. The system of claim 1 wherein said controller is configured to modulate said wet clutch during vehicle deceleration, whereby slippage of said wet clutch warms said automatic transmission fluid.

5. The system of claim 1 wherein said at least one controller is configured to terminate said partial transmission tie-up of said vehicle powertrain when said automatic transmission fluid reaches a predetermined target temperature.

6. The system of claim 5 wherein said target temperature is about 80% of an operating temperature of said automatic transmission fluid.

7. The system of claim 1 wherein during vehicle deceleration said at least one controller is configured to shift said transmission to a selected gear, modulate or lock said torque converter bypass clutch, and control a supply fuel to an engine comprising said vehicle to thereby heat at least one of engine oil and said automatic transmission fluid.

8. The system of claim 1 wherein during vehicle deceleration said at least one controller is configured to shift said transmission to a selected gear, modulate said wet clutch during said vehicle deceleration, and control a fuel supply to an engine comprising said vehicle to thereby heat said automatic transmission fluid.

9. The system of claim 1 wherein said at least one controller is configured to modulate said wet clutch during said vehicle deceleration, said modulation proportional to a brake application pressure.

10. The system of claim 1 wherein said vehicle deceleration begins above a predetermined threshold vehicle speed.

11. The system of claim 10, wherein said predetermined threshold vehicle speed is above about 10 mph.

12. The system of claim 1 wherein said at least one controller is configured to engage at least one of said torque converter bypass clutch and said wet clutch bypass clutch when at least one of an engine oil and said automatic transmission fluid is at a temperature less than a predetermined target temperature.

13. The system of claim 1 wherein said at least one controller is configured to disengage said wet clutch when a calculated temperature of said wet clutch is greater than a predetermined target temperature or said automatic transmission fluid reaches a predetermined target temperature.

14. The system of claim 1 wherein said vehicle deceleration is initiated by brake application.

15. A powertrain warm-up system, comprising:
at least one controller, said controller configured to execute programmed instructions stored in a controller readable memory;
a vehicle powertrain interfacing with said at least one controller, said vehicle power train comprising a transmission and an engine;
a wet clutch at least partially immersed in automatic transmission fluid and engaging said vehicle powertrain, said wet clutch interfacing with said at least one controller;
a torque converter bypass clutch at least partially immersed in said automatic transmission fluid and engaging said vehicle powertrain, said torque converter bypass clutch interfacing with said at least one controller; and
said at least one controller configured to control said wet clutch and said torque converter bypass clutch during vehicle deceleration following brake application to thereby heat at least one of engine oil and said automatic transmission fluid.

16. The system of claim 15 wherein said vehicle deceleration is initiated by brake application.

17. The system of claim 16 wherein said at least one controller is configured to modulate said wet clutch during said vehicle deceleration, said modulation proportional to a brake application pressure.

18. The system of claim 15 wherein said vehicle deceleration begins above a predetermined threshold vehicle speed.

19. The system of claim 18, wherein said predetermined threshold vehicle speed is above about 10 mph.

20. The system of claim 15 wherein said at least one controller is configured to engage at least one of said torque converter bypass clutch and said wet clutch bypass clutch when at least one of an engine oil and said automatic transmission fluid is at a temperature less than a predetermined target temperature.

21. The system of claim 15 wherein said at least one controller is configured to disengage said wet clutch when a calculated temperature of said wet clutch greater than a predetermined target temperature or said automatic transmission fluid reaches a predetermined target temperature.

* * * * *